Sept. 6, 1966     D. R. SMITH     3,270,796
BEAD BREAKER FOR TIRES
Filed March 4, 1965     3 Sheets-Sheet 2
Fig 2
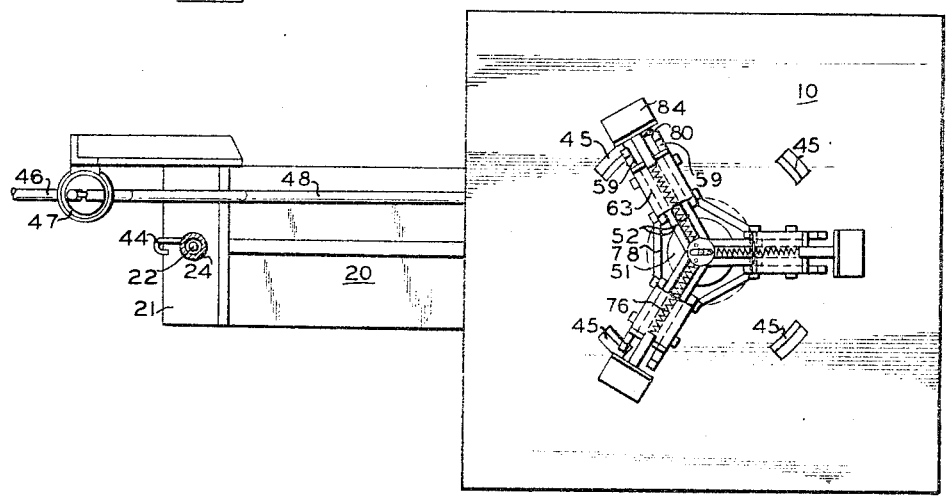
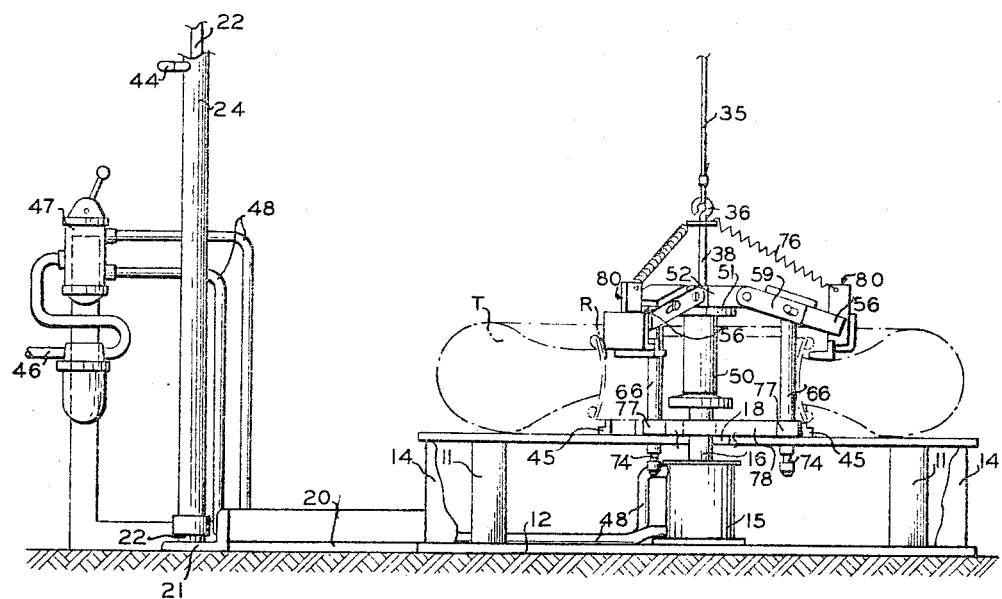
Fig 3
INVENTOR
Duel R. Smith
BY Newton, Hopkins, Jones & Ormsby
ATTORNEYS Sept. 6, 1966     D. R. SMITH     3,270,796
BEAD BREAKER FOR TIRES
Filed March 4, 1965     3 Sheets-Sheet 3
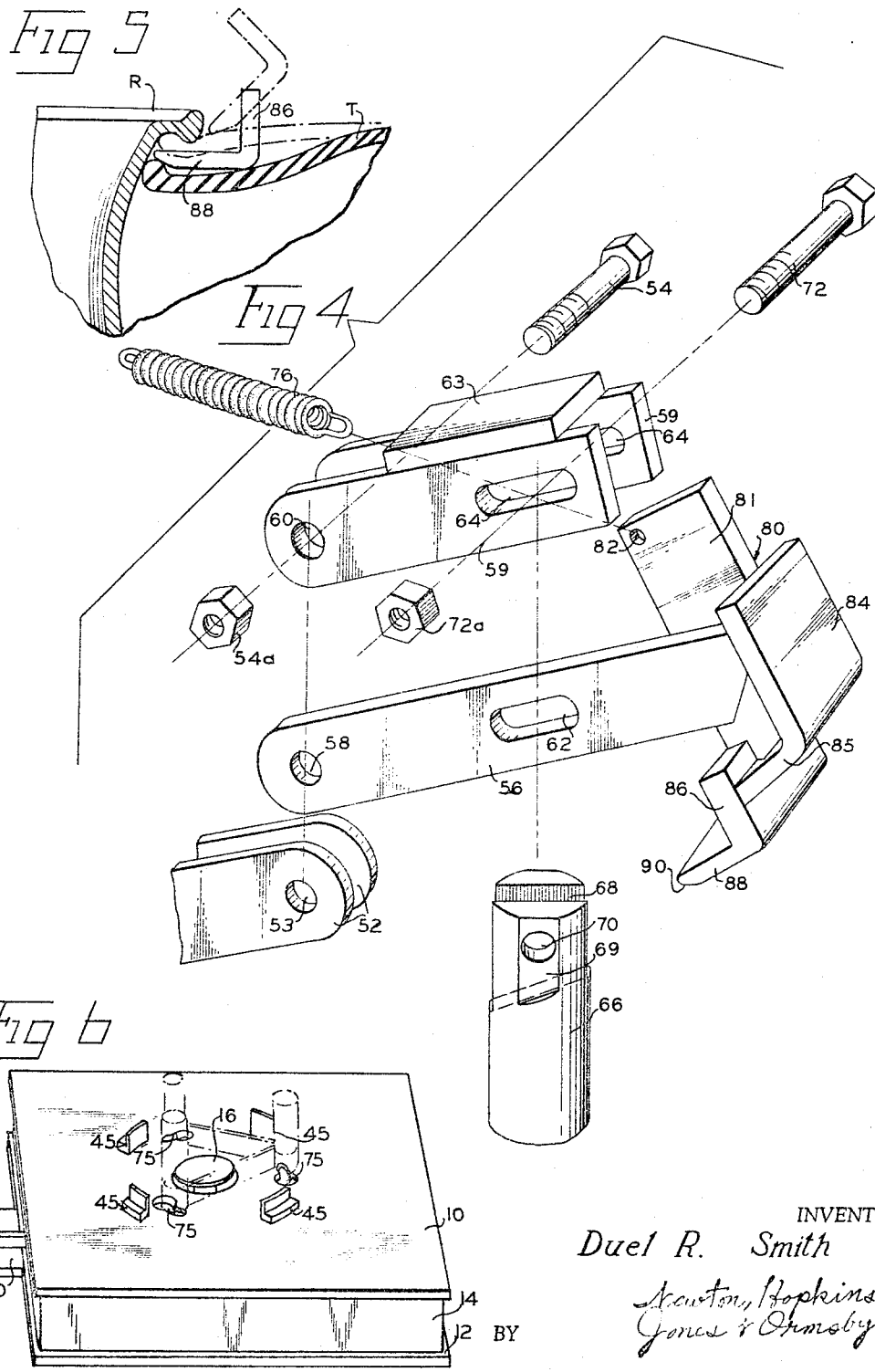
INVENTOR
Duel R. Smith
ATTORNEYS

United States Patent Office 3,270,796
Patented Sept. 6, 1966

3,270,796
BEAD BREAKER FOR TIRES
Duel R. Smith, Carrollton, Ga.
Filed Mar. 4, 1965, Ser. No. 437,053
6 Claims. (Cl. 157—1.2)

This invention relates to a bead breaker for vehicle tires and is particularly concerned with the release of a vehicle tire bead from its engagement with a supporting tire rim.

In removal of tires from their supporting and retaining rims, considerable difficulty is frequently experienced in releasing the tire bead from a receiving and retaining groove of the rim or equivalent retaining means. This difficulty is particularly pronounced in the release of heavy duty tires and/or tubeless tires. The heavy duty tires are of great weight, cumbersome, bulky and of such structural characteristics as to resist deformation. Release of the bead from the rim usually requires an inward deformation to break the bead away from the rim groove or its equivalent. Tubeless tires of both standard and heavy duty type conventionally have their beads cemented or otherwise adhesively and sealingly united in the grooves of the rims. Thus breaking away the rim from the groove requires a destruction of the cementious bond in addition to the deformation of the tire inwardly from the normal expanded position of its bead within the groove.

Numerous tools and mechanisms for accomplishing the release of tire beads from their rims have long since been designed and utilized. Manual means are usually ineffective where heavy duty, stiff, and resistant tires are to be dismounted. Hydraulic means including cylinders, pistons and lever arrangements by which the wall of the tire, adjacent the bead, is forced inwardly in a direction transverse of the walls of the tire have heretofore been provided. For the most part, such prior means have been complicated, expensive, and of such size as to be ill-suited for use in modest establishments where space is at a premium and equipment cost is a controlling factor. More particularly, however, prior devices have been primarily concerned with directing a transverse thrust on the wall of the tire adjacent the bead and depending upon the excess pressure of such thrust to fracture the union between the bead and rim and/or distort the wall of the tire to such extent as to fully detach the bead inwardly from the groove.

It is among the objects of the present invention to provide a simple and improved means for breaking the tire bead from its engagement with a supporting rim.

Another object of the invention provides means of the character set forth which is simple in construction and operation, involves few working parts, is rugged and durable, and is well designed to meet the demands for economic manufacture and economy of floor space.

A further object of the invention is to provide a power means for releasing a tire bead from the groove of a supporting rim by the simultaneous application of pressure at spaced circumferential points as an incident to the inward arcuate movement of the pressure feet whereby the release of the bead from the groove is accomplished with a minimum of total deformation of the tire wall in a transverse direction and the avoidance of damage to the walls heretofore experienced.

A further object of the invention is to provide a tire bead releasing element with a novel and improved tire engaging foot together with means for applying to the foot an arcuate thrust in direction of the tire bead section thereby releasing the bead without undue crushing of the tire walls.

These and other objects, features, and advantages of the present invention will be apparent from a consideration of the following specification taken in conjunction with the accompanying drawings, in which:

FIG. 2 is a horizontal section taken along line 2—2 of FIG. 1 looking in the direction of the arrows and with the bead releasing head in open position;

FIG. 3 is a side elevational view, partially broken away, and showing the base in cross-section;

FIG. 4 is an exploded view of the tire engaging arms and feet and the pivot arms mounting thereof;

FIG. 5 is a fragmentary detail view illustrating the movements of the tire engaging foot during the bead releasing operation; and, FIG. 6 is a detailed fragmentary view of the base showing the means for securing the bead breaking head in operative position thereon.

Figure 1:
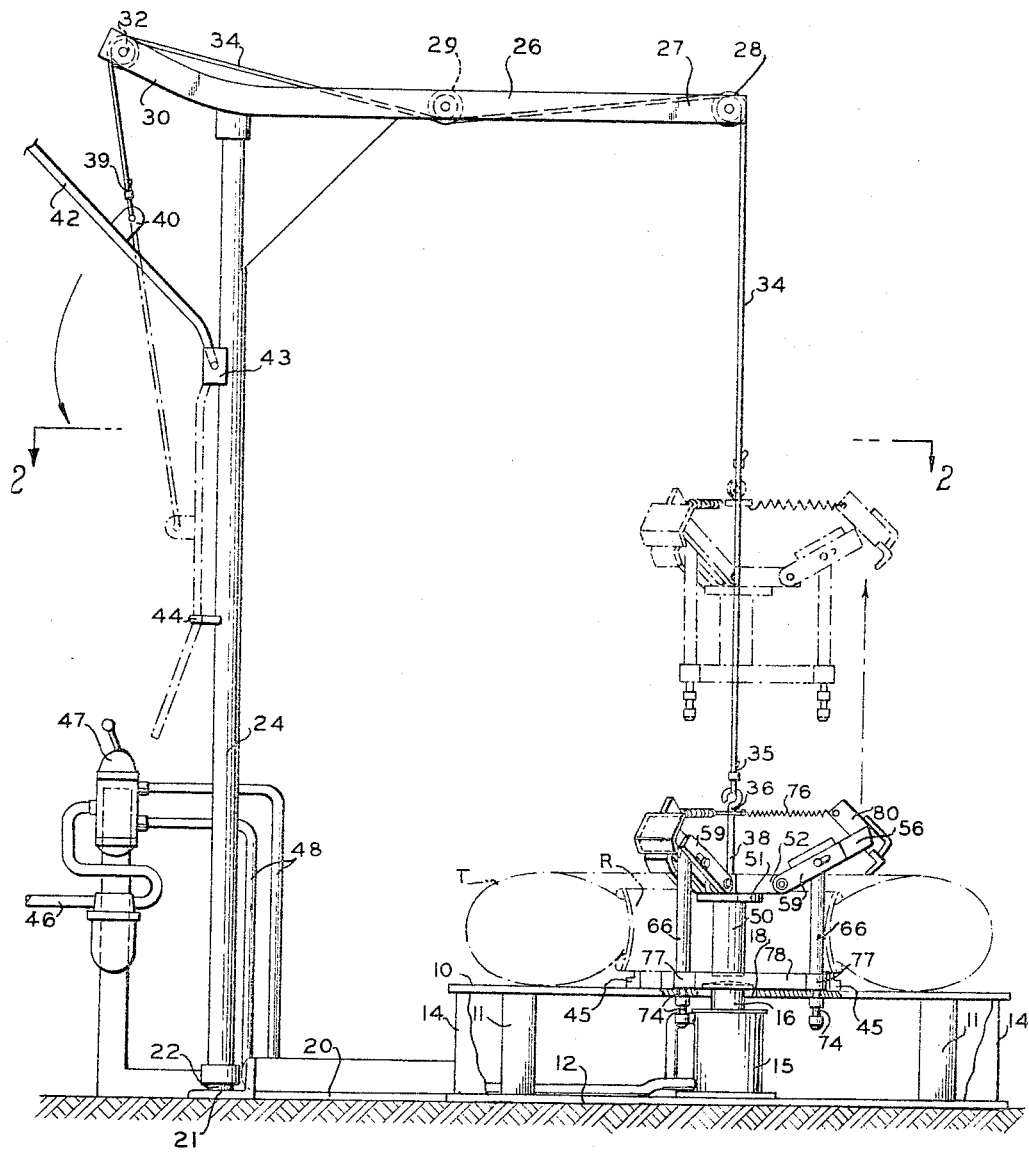
FIG. 1 is a side elevation of one embodiment of the present inventive concept.

In the present form of the invention there is provided a base structure preferably of box-like configuration including an upper flat, generally rectangular, centrally apertured tire support plate 10. The support plate 10 is mounted on legs 11 rising from a floor plate 12. Side walls 14 may be provided for enclosing the base. Within the confines of the base there is mounted upon the floor plate 12 a centrally disposed hydraulic ram 15, the piston 16 of which extends upwardly through a central aperture 18 of the support plate 10. Welded or otherwise rigidly fixed with the base is an outwardly extending base extension 20. Upon the projecting end 21 of the extension 20 there is mounted a fixed vertical guide post 22 which receives thereover, and pivotally supports, a rotatable vertical standard 24.

The upper end of the standard 24 carries a lateral pulley beam 26, pivotally movable therewith, the outer end 27 of beam 26 supporting a freely rotatable pulley wheel 28 adapted to be disposed, in operation, in vertical alignment over the aperture 18 of the support plate 10. Intermediate the ends of beam 26 there is provided an intermediate pulley wheel 29 and on the opposite inner upwardly projecting end 30 of beam 26 there is mounted a pulley 32. A flexible cable 34 is trained over the pulleys 28, 29 and 32. The outer free end 35 of the vertical flight of cable 34 from the pulley 28 is adapted to be secured to the hook 36 at the upper end of a head shank 38 of the operative head of the present device, hereinafter described in detail. The opposite end 39 of the cable 34 is secured as at 40 to an intermediate lobe of a manual control lever 42 pivoted at 43 to the rotatable vertical standard 24. In operation the lever 42 may be moved to the full line position of FIG. 1 when the cable end 35 is lowered to the full line operative position locating the head to operative position as in FIGS. 1 and 3 or the lever may be moved down to the dotted line position of FIG. 1 where it may be retained by a hook 44 mounted on the standard 24 in inoperative position as shown by dotted lines in FIG. 1.

In the operation, a tire, indicated by the dotted lines T, is disposed on the upper surface of the support plate 10 in axial alignment with the aperture 18 and upon lower bead breakers 45. The ram 15 is preferably controlled from pressure line 46 by a suitable manual control valve 47 through pipes 48. It will, of course, be understood that when the tire is positioned, the handle 42 is released to move to its upward full line position lowering the operating head to operative position as in FIGS. 1 and 3. Thereafter the hydraulic ram may be actuated to move its piston 16 upwardly to actuate the operating head in the manner hereinafter described.

The operating head supported for vertical movement by the cable 34 secured to its shank 38 includes a cylindrical body 50 including a top circular flange 51 to which the shank 38 is centrally secured. Upon the upper face of the flange 51 three pairs of radially disposed brackets 52 are provided preferably welded or otherwise fixedly secured in vertical position extending in equally angular radial directions outwardly from the center of the flange 51. The outer ends of each pair of brackets 52 (see FIG. 4), are apertured as at 53 to receive therethrough pivot bolts 54. Bolts 54, pivotally mount arms 56 between the brackets 52 by engagement through their end apertures 58. The bolts 54 also pivotally mount the inner ends of parallel pairs of parallel back-up arms 59 by extension through end apertures 60 thereof. In assembly, each arm 59 is mounted on the outer side of the brackets 52. The arrangement is such that upon assembly, intermediate elongate slots 62 of arms 56 are aligned with elongate slots 64 at the outer ends of the arms 59. Affixed to each assembly of an arm 56 and an outer pair of back-up arms 59, the latter being joined by intermediate webs 63, are actuating legs 66. The upper end of each leg 66 is furcated to form an end slot 68 to receive an arm 56 and is provided with external flat sides 69 to receive the inner faces of the back-up arms 59. The furcated ends of the legs 66 are apertured as at 70 to receive the bolt 72 which also passes through slots 62 and 64, thus to pivotally move each assembly of arms about the bolt 54 of the brackets 52 as the legs 66 are moved with respect to the body 50. Each leg 66 is rigidly attached to stand vertically from a radial arm 77 of a horizontal spider 78 which is slidable over the cylindrical body 50. The lower end of each leg 66 is formed with two or more annular recesses 74 which are releasably engaged within keyhole slots 75 of the base plate 10 (see FIG. 6), when the head is in operative position. Nuts 54a and 72a secure the bolts 54 and 72, respectively.

From the foregoing it will be seen that, for breaking of a tire bead from its rim, after the tire rim is in position on the base 10, with the tire wall adjacent the lower bead resting on the lower bead breakers 45, the head is lowered by the cable 34 whereby the lower ends of legs 66 may enter slots 75. With a slight rotation of the head, legs 66 will be locked to the plate by selective engagement of their recesses 74 in the narrow portions of slots 75. In inoperative position of the head and during the lowering thereof to operative position, springs 76 retain the arms in upwardly tilted position as shown by the dotted lines of FIG. 1.

The tire engaging feet of the head are rigidly secured as by welding to the outer ends of the projecting radial arms 56. Each foot includes a generally vertical flat base 80 welded to and extending radially with its arm 56. The upwardly projecting end 81 of the base 80 is apertured as at 82 to be engaged by the outer end of its spring 76 whereby each arm and foot assembly is, in inoperative position, pivoted upwardly as in the dotted line position of FIG. 1. Transversely of the lower outer edge of the base 80 there is fixedly secured a foot plate 84 of generally L-shaped configuration, its lower generally horizontal leg 85 fitting and secured to the lower edge of the base 80. The foot itself is also generally L-shaped including an upright body 86 and a right angular toe 88 terminating in a beveled pressure edge 90 directed inwardly and transversely of the arm 86 to which it is rigidly secured by way of foot plate 84 and base 80.

In operation, with the head lowered within the tire rim and the legs 66 secured as shown in FIGS. 1 and 6, power may be applied to the ram 15 whereupon the piston 16 is raised through the aperture 18 to engage the lower face of the central body 50. Upward movement of the body 50 by the ram 16, while legs 66 are secured to the support plate 10, will pivot the arm assemblies, as in FIG. 3, to engage the walls of the tire T. Since the movement of the tire engaging feet is arcuate and not purely transverse of the tire body, a sliding movement inwardly toward the head will ensue as indicated in FIG. 5.

By such radial movements of the feet the tire wall is not inwardly compressed to an extent by which the bead is only withdrawn from the groove, but, as distinct from such transverse movement, the bead portion of the tire is flexed inwardly with respect to the tire wall. Such movement has been found to be effective and efficient requiring less force and avoiding danger of tire wall damage.

As an incident to the breaking of the upper bead by the downward and inward movements of the toe 88, pressure is translated through the tire T against the lower bead breakers 45. Such pressure forces the lower tire wall upward to break the lower bead from the securing rim. Thus, by a single operation, both the beads are released.

In considering the present structure and its mode of operation, it is to be noted that by the fixed mounting of the ram 15 within the machine base, not only is the movable head relieved of the ram weight and required fluid pressure piping, but the fixed mounting facilitates control and lends rigidity and stability to the device materially enhancing its operative efficiency. It may also be noted that the pivotal mounting of the standard and beam insures full freedom of support platform access for placement and removal of a tire as well as providing relief from manual strain in positioning the head.

It will, of course, be understood that in the practice of the invention, numerous changes, modifications and equivalents may be resorted to without departing from the spirit or scope of the invention as outlined in the appended claims.

I claim:

1. A tire bead breaker including a tire supporting platform, a bead breaker head mounted for bodily movement to and from a position vertically over said platform, means for vertically moving said head when vertically over said platform toward said platform, power means within said supporting platform releasably engageable with said head when said head is lowered toward said platform, said head including a relatively fixed member releasably engageable with said platform and a relatively movable member releasably engageable with said power means and tire engaging arms interengaging said relatively movable member and said relatively fixed member pivotally movable in response to relative movement therebetween.

2. A tire bead breaker including a base housing, an apertured tire support on said base, an hydraulic ram in said base including a piston operable through the aperture of said tire support, a pivotally mounted vertical standard carried by said base, a beam extending from said standard and a cable depending vertically toward said support, a bead breaker head supported by said cable for releasable attachment to said support and power means within said support engageable with said head for actuating said head breaker head when engaged with said support.

3. A tire bead breaker including a relatively fixed base providing a tire supporting table defining a central aperture, an hydraulic ram within said base providing a piston vertically extensible through the aperture of said table, a tire bead breaker head, bodily movable with respect to said base, arms pivotally mounted on said breaker head, means for moving said head vertically downward with respect to said base in vertical alignment with said piston, means for securing said arms to said base when said head is moved downwardly with respect to said piston, said hydraulic ram being operable to move said piston vertically upwardly to engage said head to move said head upwardly after said arms are secured to said base, to cause pivotal movement of said arms with respect to said head, and bead breaker feet engageable with a tire mounted on said base as said arms are pivotally moved.

4. The tire bead breaker as set forth in claim 3 in which the bead breaker head is supported from said base through a pulley and cable assemble permitting lateral movement of said head with respect to said base.

5. The bead breaker as set forth in claim 3 in which the arms are slidably and pivotally secured to said base whereby said feet will move inwardly towards the rim of a tire as said arms are pivotally moved.

6. The bead breaker as set forth in claim 3 in which spring means restrain said arms against movement of their feet towards a tire on said base in the absence of upward movement of the piston of said ram.

References Cited by the Examiner

UNITED STATES PATENTS

| | | | |
|---|---|---|---|
| 2,418,849 | 4/1947 | Polt | 157—1.28 X |
| 2,446,963 | 8/1948 | Stolz | 157—1.2 |
| 2,455,580 | 12/1948 | Hewitt. | |
| 2,479,432 | 8/1949 | Tillotson | 157—1.2 |
| 2,536,139 | 1/1951 | Ritter | 157—1.2 |
| 2,890,745 | 6/1959 | Pienskewic | 157—1.2 |
| 2,892,491 | 6/1959 | Twiford | 157—1.28 |
| 3,082,812 | 3/1963 | Bickett | 157—1.2 |

GRANVILLE Y. CUSTER, JR., *Primary Examiner.*